US007260778B2

(12) United States Patent
Baron et al.

(10) Patent No.: US 7,260,778 B2
(45) Date of Patent: Aug. 21, 2007

(54) PRINTING PAGES IN ACCORDANCE WITH A REMAINDER COMPUTATION FORMULA

(75) Inventors: Dominique Baron, Vence (FR); Alain Benayoun, Cagnes sur Mer (FR); Christine Drouot, Saint Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 10/272,323

(22) Filed: Oct. 16, 2002

(65) Prior Publication Data

US 2003/0084406 A1 May 1, 2003

(30) Foreign Application Priority Data

Oct. 26, 2001 (EP) .................................. 01480103

(51) Int. Cl.
*G06F 17/21* (2006.01)

(52) U.S. Cl. ...................................... 715/525; 358/1.18

(58) Field of Classification Search ........ 715/517–521, 715/525–527, 908–910
See application file for complete search history.

(56) References Cited

U.S. PATENT DOCUMENTS 5,398,310 A * 3/1995 Tchao et al. ................ 715/541
5,495,561 A * 2/1996 Holt .......................... 358/1.15
5,563,996 A * 10/1996 Tchao ......................... 715/521
5,590,256 A * 12/1996 Tchao et al. ................ 715/525
6,332,149 B1 * 12/2001 Warmus et al. ............. 715/517
2004/0205603 A1 * 10/2004 Nguyen et al. ............. 715/517

OTHER PUBLICATIONS

"IMPRINT The Newsletter of Digital Typography", vol. 1, No. 6, 1997—http://www.etext.org/Zines/ASCII/IMPRINT/imprint1.6.txt.*
Lemay et al, "Laura Lemay's Web Workshop, JavaScript", pp. 61-65, Sams.net, 1996.*
Lemay et al, "Laura Lemay's Web Workshop, JavaScript", pp. 34-37, Sams.net, 1996.*
Blue Squirrel "ClickBook Version 5.0 User's Guide", 1995-2001.

* cited by examiner

*Primary Examiner*—Cesar Paula
(74) *Attorney, Agent, or Firm*—Schmeiser, Olsen & Watts; John R. Pivnichny

(57) ABSTRACT

A system and method to print graphic documents in booklet format. The system allows the user to have a booklet print option available as a print option of a graphic editor. The system generates a plurality of graphic pages, and orders the pages into logical sequences, each logical sequence being associated to a predefined layout. The ordering of the pages includes ordering the plurality of graphic pages into a booklet logical sequence, where the booklet logical sequence is associated with a booklet layout. The pages are ordered according to the value of a remainder 'R' according to 'R=N_modulo(4)', wherein 'N' is the number of graphic pages to be ordered.

21 Claims, 9 Drawing Sheets

300 Select Booklet Layout
302 Determine 'N'
304 Determine 'R = N modulo (4)'
306 R = 0 → Go to 400
308 R = 1 → Go to 418
310 R = 2 → Go to 446
312 R = 3 → Go to 474

PRINTING PAGES IN ACCORDANCE WITH A REMAINDER COMPUTATION FORMULA

TECHNICAL FIELD

The present invention relates to printing methods and systems in general and in particular to methods and systems for printing graphic-type documents in booklet format.

BACKGROUND OF THE INVENTION

Graphic systems or editors allow the creation of multiple-page graphic documents in an electronic medium. The format of a document, such as character type or size or line spacing, can be electronically changed. Text or pictures can also be incorporated into the graphic document. It is frequently desirable to print such graphic documents with various layouts. Graphic editors offer several printing options to the user such as a full page printing, a portrait or a landscape printing orientation to name a few.

However, a specific requirement with the graphic editors is to print documents in a booklet format where the sheets of paper are printed on both sides, each side having two pages printed on it. The printed booklet may be later folded and assembled to form a small book, for example, a booklet recording a speaker's presentation.

It is of course obvious that to form a final booklet from a series of original pages, it is desirable to place the original pages in a particular order so that the booklet, when assembled, will maintain a logical reading order.

In conventional printing systems, the booklet is obtained either after printing several times an original page or by rotating a page to be printed in several orientations. U.S. Pat. Nos. 4,852,487, 5,183,347 and 5,973,721 illustrate some of such prior art solutions which result in complex and long printing apparatus requiring manual human intervention.

Therefore there is a need for a method and system to easily and rapidly print in a booklet format documents that are created with a graphic editor.

SUMMARY OF THE INVENTION

In view of the foregoing and other problems of the conventional systems and methods, it is an object of the invention to provide a very simple method to print documents in a booklet format directly from a graphic editor.

The system allows the user to have a booklet print option available as any standard print option of a graphic editor.

In a preferred embodiment, the system comprises means for generating a plurality of graphic pages, and means for ordering the plurality of graphic pages into logical sequences, each logical sequence being respectively associated with a predefined layout. In the present invention, the ordering means further comprises means for ordering the plurality of graphic pages into a booklet logical sequence, said booklet logical sequence being associated with a booklet layout.

In a preferred embodiment, the plurality of graphic pages are ordered according to the value of the remainder 'R' obtained by computing the following equation 'R=N modulo(4)', wherein 'N' is the number of graphic pages to be ordered.

The system further comprises means for selecting a booklet layout option, and for printing the ordered plurality of graphic pages.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Before being printed, graphical documents may be generated using a graphic editor. Freelance from Lotus Corporation or PowerPoint from Microsoft Corporation are known graphic editors that can allow the generation of graphic documents under the Windows platform. Those editors and others can make use of the present invention in an easy way as will now be described. Moreover, although the description assumes that the final document is directly printed on a printer, the present invention also allows output of the final document either on a display screen or sent through a network as a graphic file to be output later.

Figure 1:
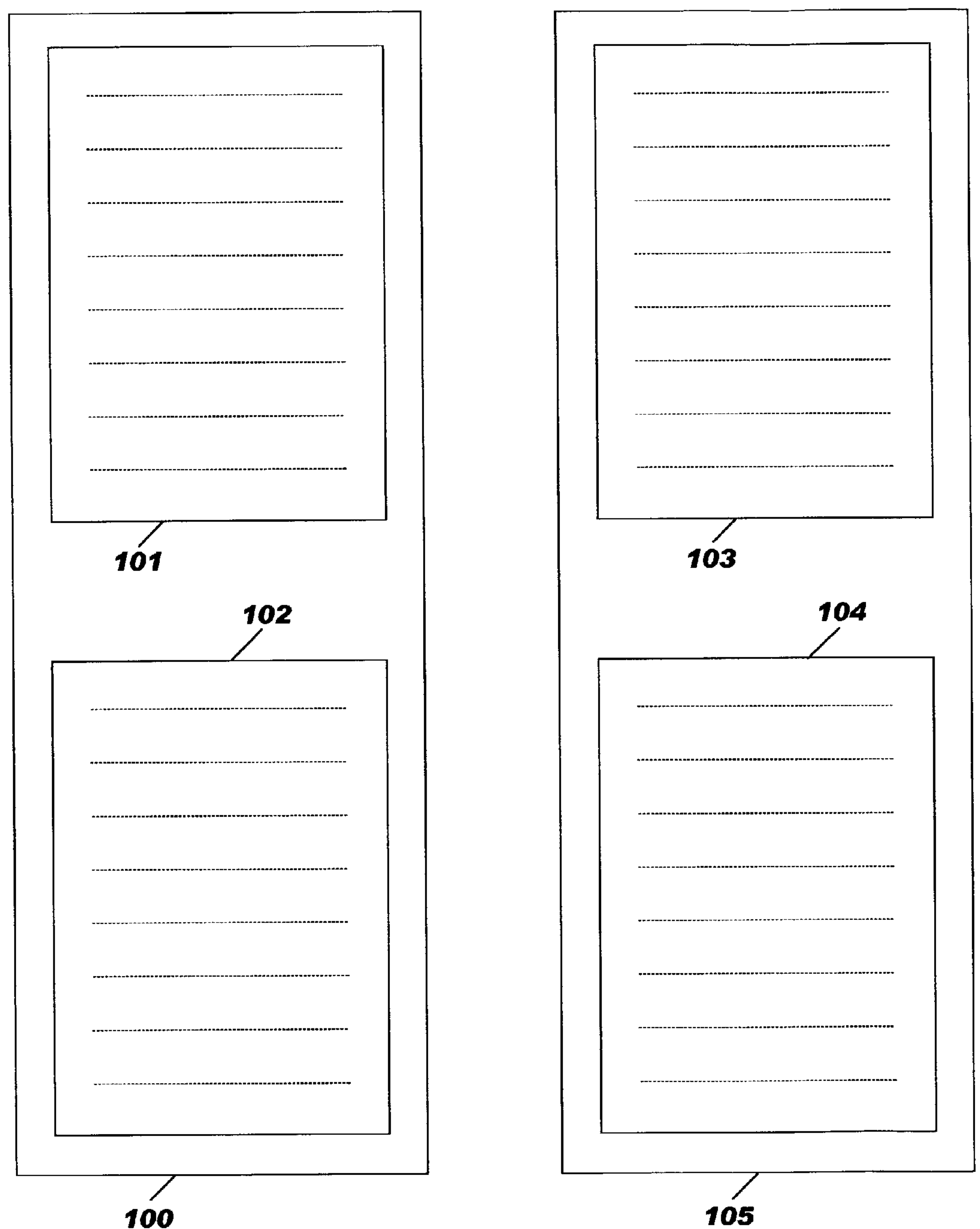
FIG. 1 is prior art showing four-page, dual-side printing.

FIG. 1 shows a print output of the final document on a vertical dual side sheet of paper (100,105), obtained by selecting a 'Handouts' PRINT option as generally provided by graphic editors.

The sheet of paper has a first side 100 and a second side 105 (to be also called herein respectively the recto side and the verso side). Each side is printed vertically as follows. On the first side, the print starts on the top of the sheet with a first page 101 which is the first page of the document (numbered one); then the print continues on the bottom of the sheet with a second page 102 which is the second page of the document (numbered two). Next, the sheet is turned over to print the verso side 105. The print starts again on the top of the sheet with a third page 103 which is the third page of the document (numbered three), and then the print ends on the bottom of the sheet with a fourth page 104 which is the fourth page of the document (numbered four).

The format of the printed document is thus a vertical sheet of paper, but it cannot be folded double to be correctly read.

Figure 2A:
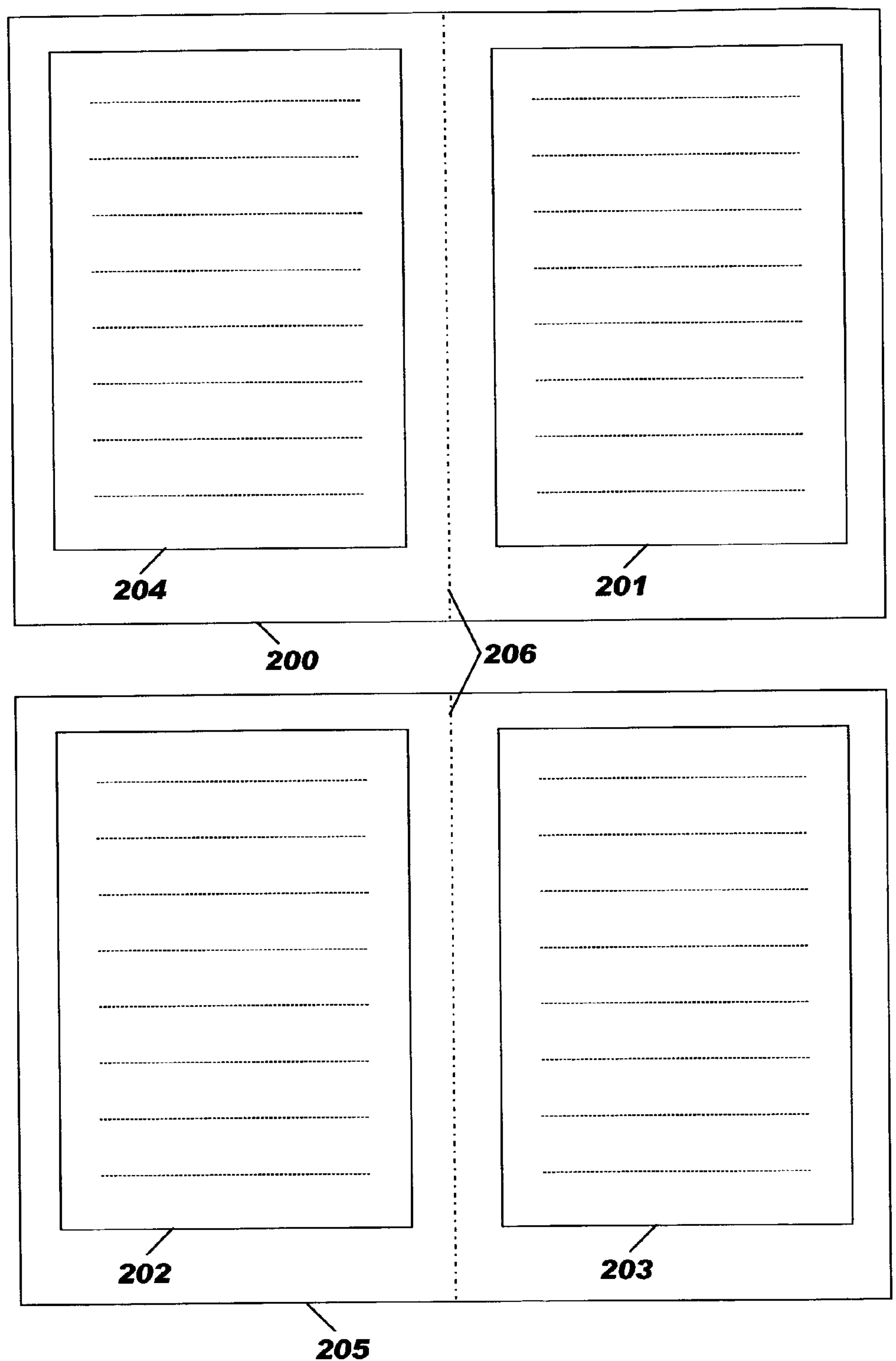
FIGS. 2A and 2B show two views of four-page, dual-side printing using this invention.
Figure 2B:
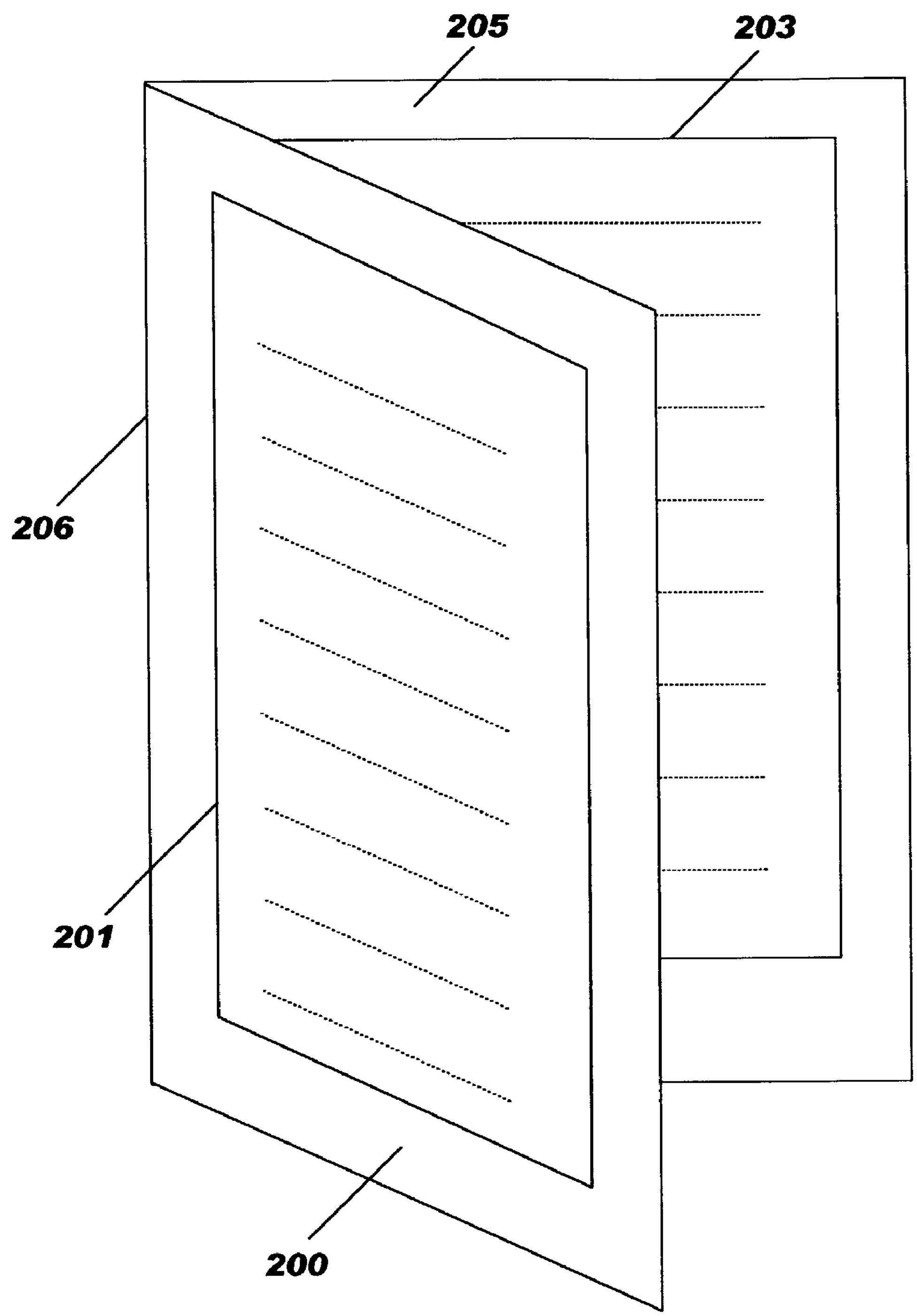

FIGS. 2A and 2B show two views of a print output of four pages on a dual-side sheet of paper when using the present invention. The system and method of the invention allow folding the sheet of paper in its middle when printed to obtain a half size booklet to be correctly read.

The sheet of paper has a first side 200 (recto) and a second side 205 (verso). Each side of the sheet of paper is printed horizontally. The print starts on the left part of the first side 200 by printing a first page 204 which is to the fourth page of the final document (numbered four); then the print continues on the right part of the first side by printing a second page 201 which is to the first page of the final document (numbered one).

The sheet is next flipped as in a conventional duplex printing by flipping the sheet along the short axis, and the print proceeds on the second side 205. A third page 202 is printed on the left part of the verso sheet which is the second page of the document (numbered two); then the print continues on the right part of the sheet with a fourth page 203 which is the third page of the final document (numbered three).

With this page arrangement, the horizontal sheet of paper can then be folded double in its middle (represented by a dotted line 206) to create a half sheet booklet having the pages in the right order for the reader as shown on FIG. 2B.

The pages printing sequence is now described with reference to FIGS. 3 to 5. To operate the invention, a user selects a 'Booklet' option to enter the algorithm routine. It is to be noted that those having ordinary skill in the art will easily devise ways to include this option in products by way of, for example, a dedicated key to be pressed or a representative icon to be selected.

Figure 3:
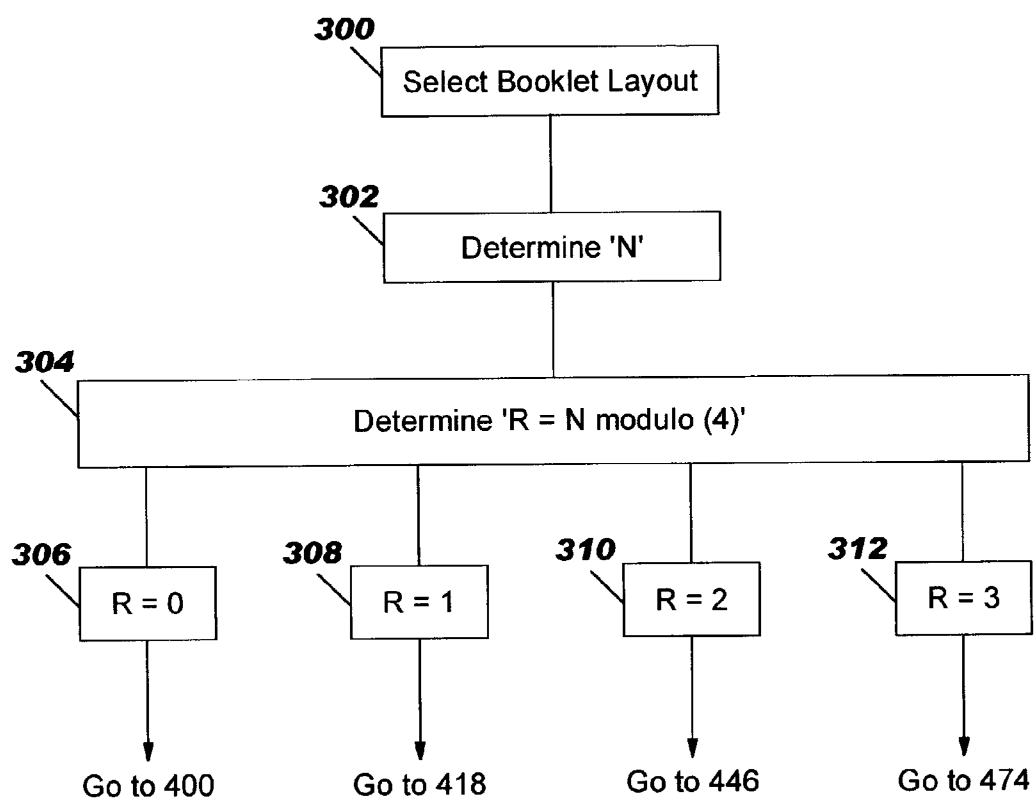
FIG. 3 is a flow chart of the general process to operate the invention.

After the option is selected, the computer presets the printer in horizontal duplex mode (both sides of the sheet of paper) at step 300 on FIG. 3. On next step 302, the total number 'N' of pages to be printed is determined. Next, the process computes the value 'R' associated with the value of 'Nmodulo(4)' and may enter one of four different subroutines 306, 308, 310 or 312 according to the value of 'R'.

Figure 4A:
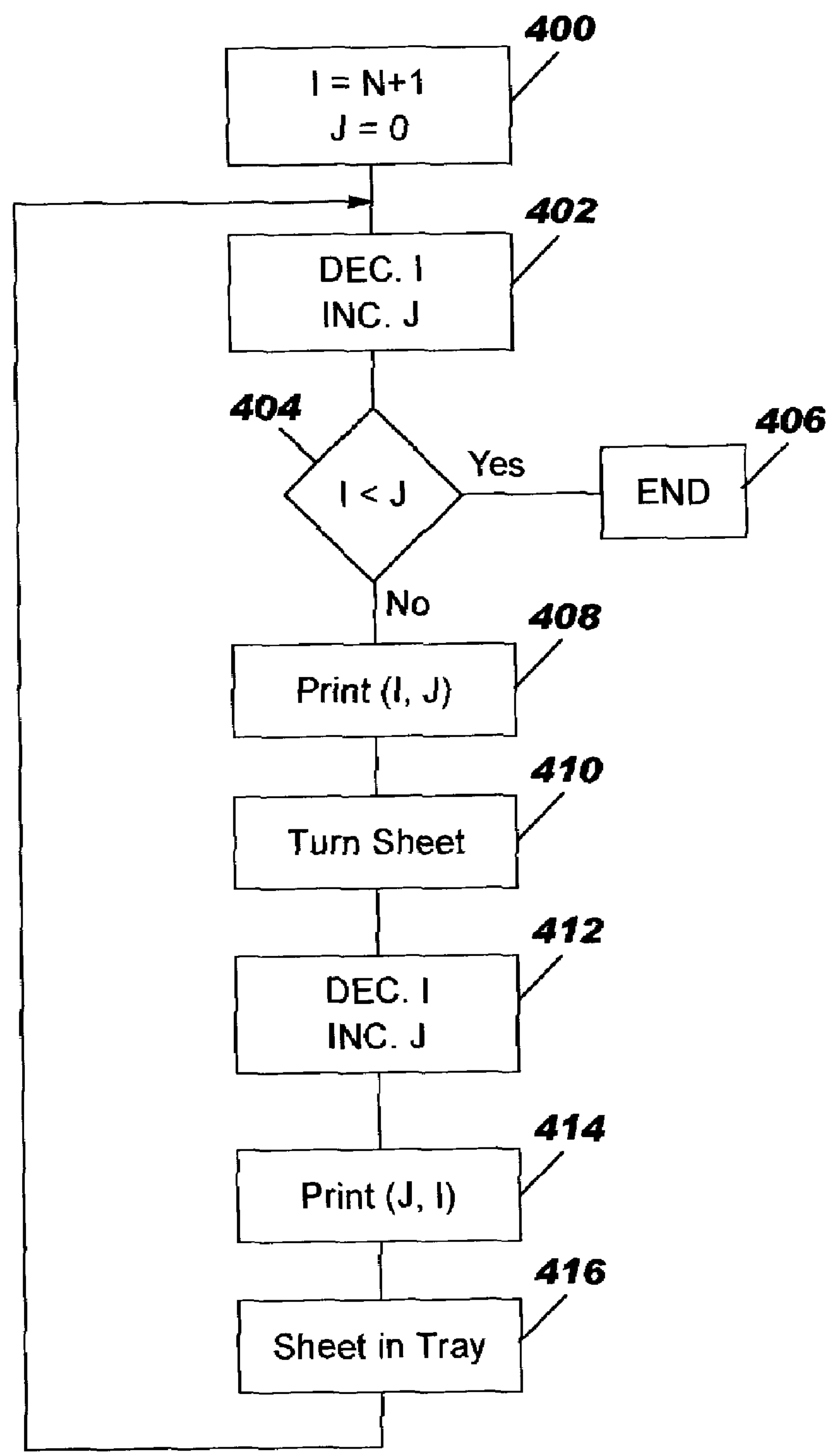
FIGS. 4A to 4D detail subroutines of the general process of FIG. 3.

If 'R' is equal to zero, then the process goes to step 400 to be immediately described with reference to FIG. 4A. If 'R' is equal to one, then the process goes to step 418 to be described with reference to FIG. 4B. If 'R' is equal to two, then the process goes to step 446 to be described with reference to FIG. 4C. If 'R' is equal to three, then the process goes to step 474 to be described with reference to FIG. 4D.

The description is now detailed for the case where the remainder 'R' is equal to zero (R=0). The process follows the steps shown in FIG. 4A. In step 400 a first variable 'I' is set to an initial value of 'N+1', and a second variable 'J' is set to 0. Next, on step 402 the algorithm enters a loop where the variable I is decremented by one and the variable J is incremented by one.

On step 404, the two variables (I,J) are compared. If the value of variable I is less than the value of variable J (branch Yes), then the process ends (step 406). If variable I is not less than variable J (branch No), then the process goes to step 408. On step 408, the page number I is sent to the printer to be printed on the left hand side of the sheet of paper and the page number J is sent to the printer to be printed on the right hand side of the sheet of paper. On next step 410, a request to flip the sheet of paper on the short edge is sent to the printer.

Next, variable I is decremented by one and variable J is incremented by one (step 412).

On step 414, the page number J is sent to the printer to be printed on the left hand side of the sheet of paper and the page number I is sent to the printer to be printed on the right hand side of the sheet of paper.

On step 416, a request to push the sheet of paper to the user tray is sent to the printer. A new blank sheet of paper is then ready for the print and the process jumps back to step 402 for printing the next sheet.

Figure 4B:
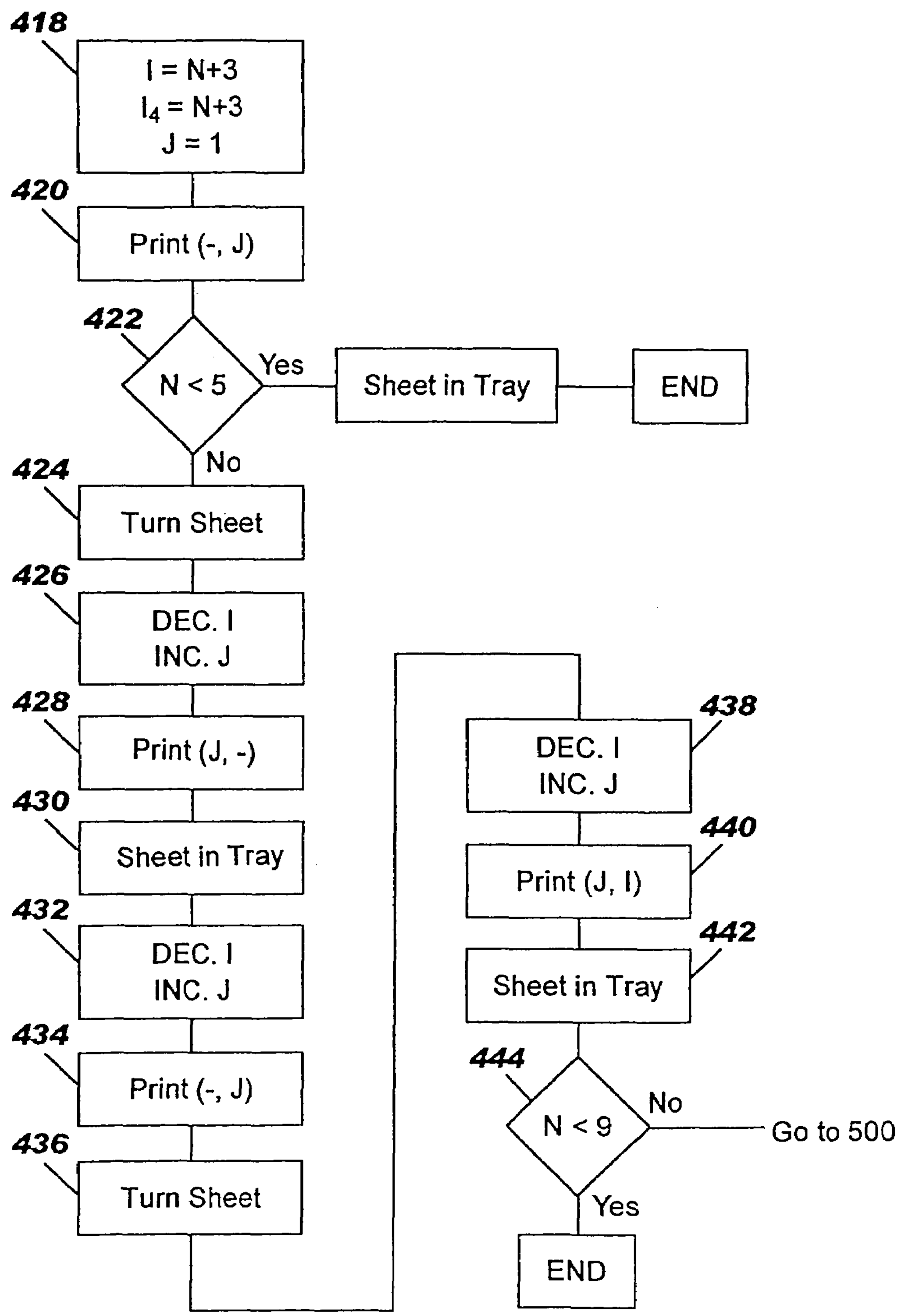

For a remainder equal to one (R=1), the process enters step 418 as shown on FIG. 4B. On step 418, the variable I is set to the value 'I=N+3', a variable I4 is fixed to the initial value 'I4=N+3' and the variable J is set to 1. On the next step 420, the page number J is sent to the printer to be printed on the right hand side of the sheet of paper, the left hand side being left blank. The value of 'N' is next tested (step 422) to output the sheet and end the process when 'N' is less than five (branch Yes) or to continue when 'N' is not less than five (branch No). On step 424, the request to turn the sheet of paper on the short edge is sent to the printer. Variable I is decremented by one on next step 426 while variable J is incremented by one. Next, on step 428, the page number J is sent to the printer to be printed on the left hand side of the sheet of paper, the right hand side being left blank. On following step 430, the sheet of paper has been printed on both sides and a request to push it to the user tray is sent to the printer. On step 432, the variable I is decremented by one and the variable J is incremented by one. On next step 434, the page number J is sent to the printer to be printed on the right hand side of the sheet of paper, the left hand side being left blank. On step 436, the request to turn the sheet of paper on the short edge is sent to the printer. Variable I is decremented by one on next step 438 while variable J is incremented by one. Next, on step 440, the page number J is sent to the printer to be printed on the left hand side of the sheet of paper, and the page number I is sent to the printer to be printed on the right hand side of the sheet of paper. On following step 442, the sheet of paper has been printed on both sides and a request to push it to the user tray is sent to the printer. Then the process tests the value of 'N' (step 444). If 'N' is less than 9, then the process ends (branch Yes); otherwise, the process goes to step 500 (branch No).

A third case is when the remainder is equal to two (R=2). The process enters step 446 as shown on FIG. 4C. On step 446, the variable I is set to the value 'I=N+2', the variable 14 is fixed to the initial value 'I4=N+2' and the variable J is set to 1. On next step 448, the page number J is sent to the printer to be printed on the right hand side of the sheet of paper, the left hand side being left blank. On step 450, the request to turn the sheet of paper on the short edge is sent to the printer. Variable I is decremented by one on next step 452 while variable J is incremented by one. Next, on step 454, the page number J is sent to the printer to be printed on the left hand side of the sheet of paper, the right hand side being left blank. On following step 456, the sheet of paper has been printed on both sides and a request to push it to the user tray is sent to the printer. The value of 'N' is then tested (step 458) to end the process when 'N' is less than five (branch Yes) or to continue with step 460 when 'N' is not less than five (branch No). On step 460, the variable I is decremented by one and the variable J is incremented by one. On next step 462, the page number J is sent to the printer to be printed on the right hand side of the sheet of paper, and the page number I is sent to the printer to be printed on the left hand side. On step 464, the request to turn the sheet of paper on the short edge is sent to the printer. Variable I is decremented by one on next step 466 while variable J is incremented by one. Next, on step 468, the page number J is sent to the printer to be printed on the left hand side of the sheet of paper, and the page number I is sent to the printer to be printed on the right hand side. On following step 470, the sheet of paper has been printed on both sides and a request to push it to the user tray is sent to the printer. The value of 'N' is then tested (step 472) to end the process when 'N' is less than nine (branch Yes) or to continue with step 500 when 'N' is not less than nine (branch No).

The last case is when the remainder is equal to three (R=3). The process enters step 474 as shown on FIG. 4D. On step 474, the variable I is set to the value 'I=N+1', the variable 14 is fixed to the initial value 'I4=N+1' and the variable J is set to 'J=1'. On next step 476, the page number J is sent to the printer to be printed on the right hand side of the sheet of paper, the left hand side being left blank. On step 478, the request to turn the sheet of paper on the short edge is sent to the printer. Variable I is decremented by one on next step 480 while variable J is incremented by one. Next, on step 482, the page number J is sent to the printer to be printed on the left hand side of the sheet of paper, and the page number I is sent to the printer to be printed on the right hand side. On following step 484, the sheet of paper has been printed on both sides and a request to push it to the user tray is sent to the printer. The value of 'N' is then tested (step 486) to end the process when 'N' is less than five (branch Yes) or to continue with step 488 when 'N' is not less than five (branch No). On step 488 the variable I is decremented by one and the variable J is incremented by one. On next step 490, the page number J is sent to the printer to be printed on the right hand side of the sheet of paper, and the page number I is sent to the printer to be printed on the left hand side. On step 492, the request to turn the sheet of paper on the short edge is sent to the printer. Variable I is decremented by one on next step 494 while variable J is incremented by one. Next, on step 496, the page number J is sent to the printer to be printed on the left hand side of the sheet of paper, and the page number I is sent to the printer to be printed on the right hand side. On following step 498, the sheet of paper has been printed on both sides and a request to push it to the user tray is sent to the printer. The value of 'N' is then tested (step 499) to end the process when 'N' is less than nine (branch Yes) or to continue with step 500 when 'N' is not less than nine (branch No). The process then goes to step 500 shown on FIG. 5 to be immediately described.

Figure 4C:
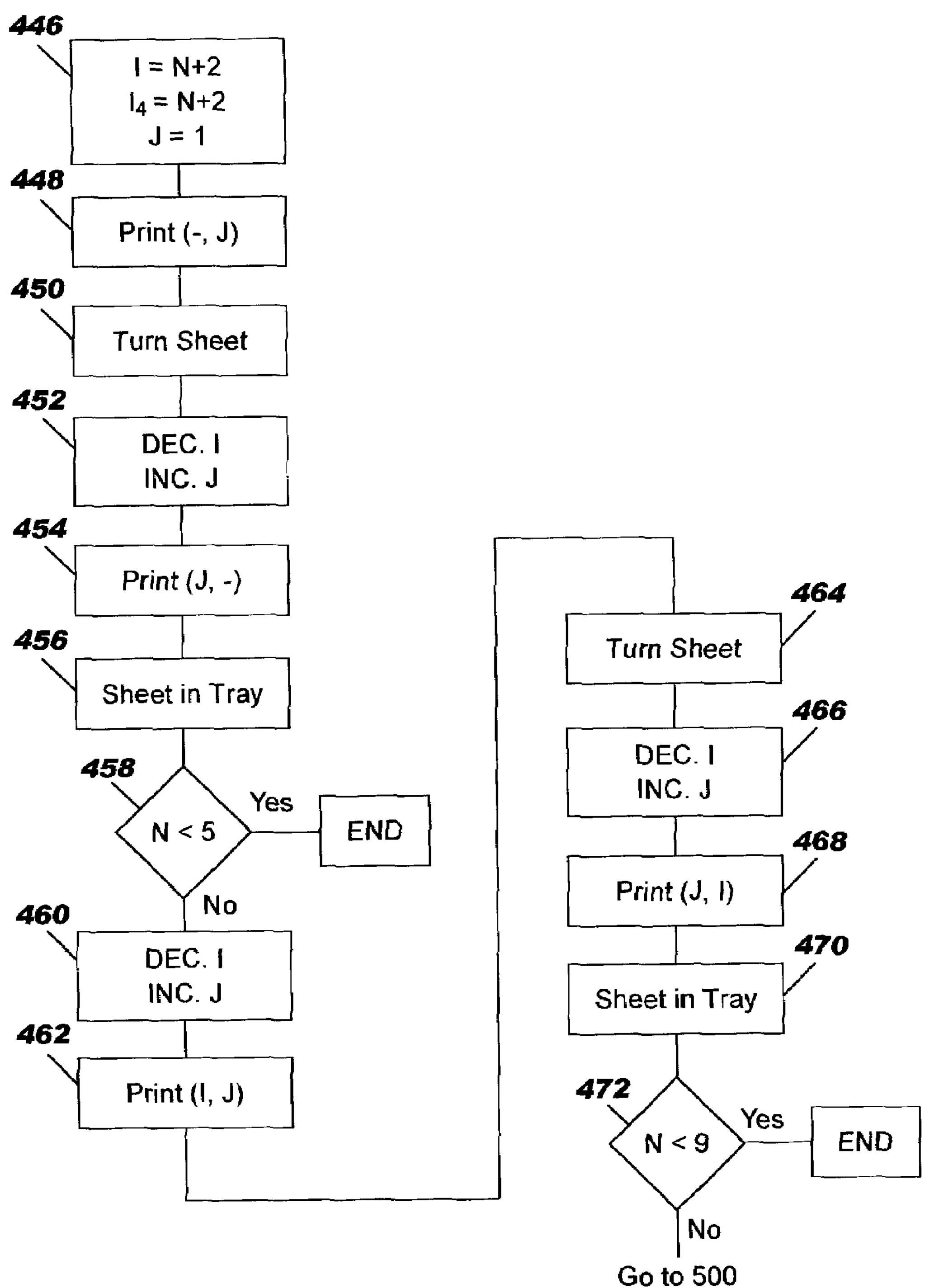
Figure 4D:
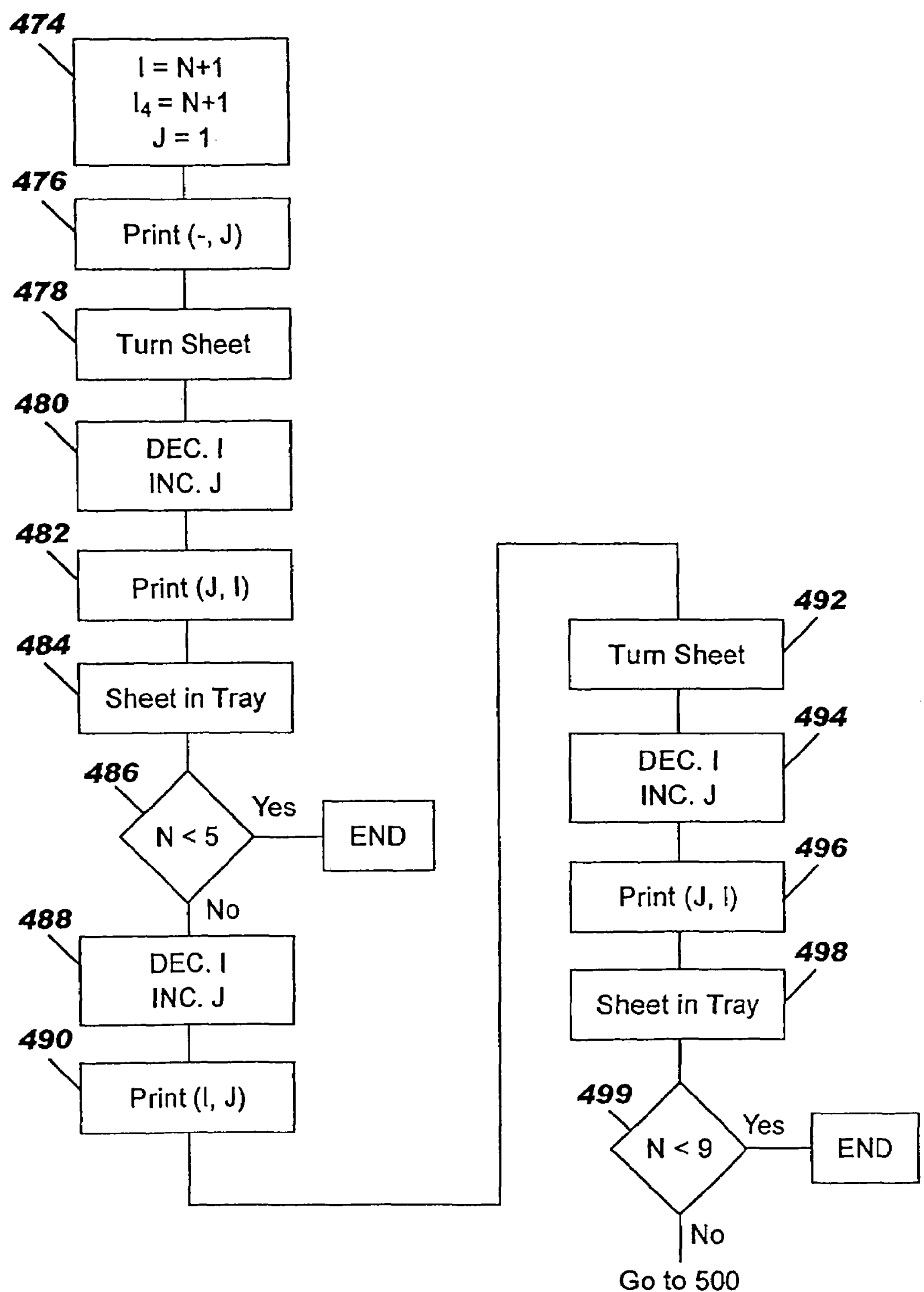
Figure 5:
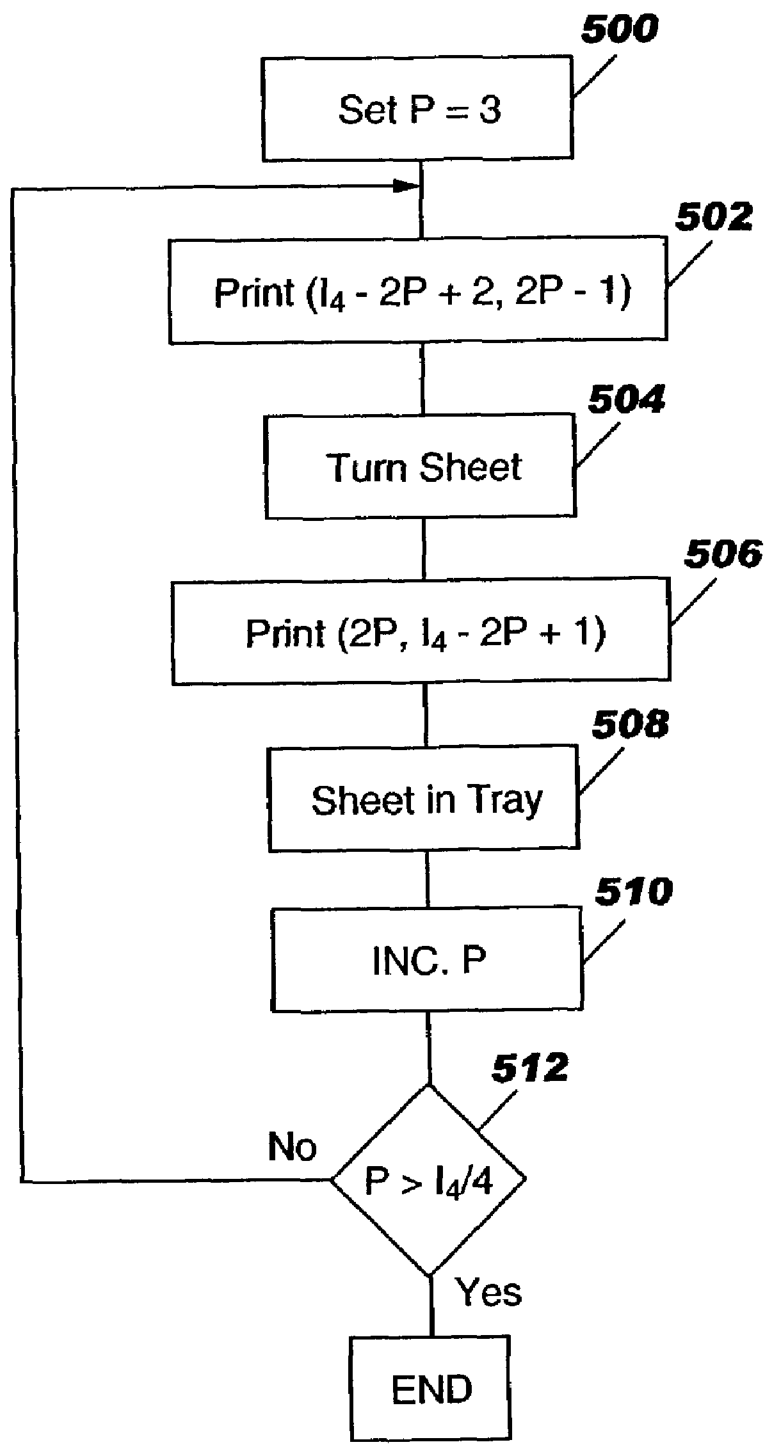
FIG. 5 is a common subroutine of the subroutines of FIGS. 4B to 4D.

FIG. 5 shows the steps to be processed following the last step of the previously described subroutines of FIGS. 4B, 4C and 4D. On step 500, a new variable 'P' is set to the value 'P=3'. On next step 502, the page number '2P−1' is sent to the printer to be printed on the right hand side of the sheet of paper, and the page number 'I4−2P+2' is sent to the printer to be printed on the left hand side. On step 504, the request to turn the sheet of paper on the short edge is sent to the printer. On next step 506, the page number 'I4−2P+1' is sent to the printer to be printed on the right hand side of the sheet of paper, and the page number '2P' is sent to the printer to be printed on the left hand side. On following step 508, the sheet of paper has been printed on both sides and a request to push it to the user tray is sent to the printer. Variable 'P' is incremented by one on next step 510, and on step 512, 'P' is compared to the variable 'I4/4'. If variable 'P' is higher, then the process ends (branch Yes). If variable 'P' is less than or equal to the variable 'I4/4', then the process loops back to step 502.

It is to be appreciated by those skilled in the art that while the invention has been particularly shown and described with reference to a preferred embodiment thereof, various changes in form and details may be made without departing from the spirit and scope of the invention. In particular, the processes of FIG. 4A and FIG. 5 has been described as two different implementations of the general process and could be merged in a unique process to reduce the storage memory used.

We claim:

1. A method for printing N graphic pages as a booklet document, said N pages being numbered as page 1, page 2, . . . , page N, said N being a positive integer of at least 2, said method comprising the steps of:

computing a remainder R such that R=N modulo(4); and printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=1, and wherein said printing the N pages comprises the steps of:

(a) providing the sheets in a printer such that a next sheet available for being printed is in the printer;

(b) setting I=N+3, I4=N+3, and J=1;

(c) after steps (a)-(b), printing page J on the right hand side of the next sheet;

(d) if N<5 then removing the printed next sheet from the printer and ending said printing the N pages, otherwise:

(e) turning the next sheet in the printer on a short edge of the next sheet;

(f) decrementing I by 1 and incrementing J by 1;

(g) printing page J on the left hand side of the next sheet;

(h) removing the printed next sheet from the printer such that another sheet in the printer becomes the next sheet available for being printed;

(i) decrementing I by 1 and incrementing J by 1;

(j) printing page J on the right hand side of the next sheet;

(k) turning the next sheet in the printer on a short edge of the next sheet;

(l) decrementing I by 1 and incrementing J by 1;

(m) printing page J on the left hand side of the next sheet and printing page I on the right hand side of the next sheet;

(n) removing the printed next sheet from the printer such that another sheet in the printer becomes the next sheet available for being printed, wherein steps (c)-(n) are performed in the order recited;

(o) after step (n), if N<9 then removing the printed next sheet from the printer and ending said printing the N pages, otherwise:

(p) setting P=3;

(q) after step (p), printing page I4−2P+2 on the left hand side of the next sheet and printing page 2P−1 on the right hand side of the next sheet;

(r) turning the next sheet in the printer on a short edge of the next sheet;

(s) printing page 2P on the left hand side of the next sheet and printing page I4−2P+1 on the right hand side of the next sheet;

(t) removing the printed next sheet from the printer such that another sheet in the printer becomes the next sheet available for being printed;

(u) incrementing P by 1;

(v) if P<I4/4 then ending said printing the N pages, otherwise looping back to step (q) and performing steps (q)-(v) iteratively until said printing the N pages ends in step (v), wherein steps (q)-(v) are performed in the order recited.

2. The method of claim 1, wherein N<9.

3. A method for printing N graphic pages as a booklet document, said N pages being numbered as page 1, page 2, . . . , page N, said N being a positive integer of at least 2, said method comprising the steps of:

computing a remainder R such that R=N modulo(4); and printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=2 or R=3, and wherein said printing the N pages comprises the steps of:

(a) providing the sheets in a printer such that a next sheet available for being printed is in the printer;

(b) if said computing has computed R=2 then setting I=N+2, I4=N+2, and J=1, and if said computing has computed R=3 then setting I=N+1, I4=N+1, and J=1;
(c) after steps (a)-(b), printing page J on the right hand side of the next sheet;
(d) turning the next sheet in the printer on a short edge of the next sheet;
(e) decrementing I by 1 and incrementing J by 1;
(f) printing page J on the left hand side of the next sheet, and if said computing has computed R=3 then printing page I on the right hand side of the next sheet;
(g) removing the printed next sheet from the printer such that another sheet in the printer becomes the next sheet available for being printed;
(h) if N<5 then removing the printed next sheet from the printer and ending said printing the N pages, otherwise:
  (i) decrementing I by 1 and incrementing J by 1;
  (j) printing page I on the left hand side of the next sheet and printing page J on the right hand side of the next sheet;
  (k) turning the next sheet in the printer on a short edge of the next sheet;
  (l) decrementing I by 1 and incrementing J by 1;
  (m) printing page J on the left hand side of the next sheet and printing page I on the right hand side of the next sheet;
  (n) removing the printed next sheet from the printer such that another sheet in the printer becomes the next sheet available for being printed, wherein steps (c)-(n) are performed in the order recited;
  (o) after step (n), if N<9 then removing the printed next sheet from the printer and ending said printing the N pages, otherwise:
    (p) setting P=3;
    (q) after step (p), printing page I4−2P+2 on the left hand side of the next sheet and printing page 2P−1 on the right hand side of the next sheet;
    (r) turning the next sheet in the printer on a short edge of the next sheet;
    (s) printing page 2P on the left hand side of the next sheet and printing page I4−2P+1 on the right hand side of the next sheet;
    (t) removing the printed next sheet from the printer such that another sheet in the printer becomes the next sheet available for being printed;
    (u) incrementing P by 1;
    (v) if P<I4/4 then ending said printing the N pages, otherwise looping back to step (q) and performing steps (q)-(v) iteratively until said printing the N pages ends in step (v), wherein steps (q)-(v) are performed in the order recited.

4. The method of claim 3, wherein said computing has computed R=2.

5. The method of claim 4, wherein N<9.

6. The method of claim 3, wherein said computing has computed R=3.

7. The method of claim 6, wherein N<9.

8. A computer program product, comprising a computer usable medium having a computer readable program code embodied therein, said computer readable program code comprising an algorithm adapted to implement a method for printing N graphic pages as a booklet document, said N pages being numbered as page 1, page 2, . . . , page N, said N being a positive integer of at least 2, said method comprising the steps of:

computing a remainder R such that R=N modulo(4); and
printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=1, and wherein said printing the N pages comprises the steps of:
(a) providing the sheets in a printer such that a next sheet available for being printed is in the printer;
(b) setting I=N+3, I4=N+3, and J=1;
(c) after steps (a)-(b), printing page J on the right hand side of the next sheet;
(d) if N<5 then removing the printed next sheet from the printer and ending said printing the N pages, otherwise:
  (e) turning the next sheet in the printer on a short edge of the next sheet;
  (f) decrementing I by 1 and incrementing J by 1;
  (g) printing page J on the left hand side of the next sheet;
  (h) removing the printed next sheet from the printer such that another sheet in the printer becomes the next sheet available for being printed;
  (i) decrementing I by 1 and incrementing J by 1;
  (j) printing page J on the right hand side of the next sheet;
  (k) turning the next sheet in the printer on a short edge of the next sheet;
  (l) decrementing I by 1 and incrementing J by 1;
  (m) printing page J on the left hand side of the next sheet and printing page I on the right hand side of the next sheet;
  (n) removing the printed next sheet from the printer such that another sheet in the printer becomes the next sheet available for being printed, wherein steps (c)-(n) are performed in the order recited;
  (o) after step (n), if N<9 then removing the printed next sheet from the printer and ending said printing the N pages, otherwise:
    (p) setting P=3;
    (q) after step (p), printing page I4−2P+2 on the left hand side of the next sheet and printing page 2P−1 on the right hand side of the next sheet;
    (r) turning the next sheet in the printer on a short edge of the next sheet;
    (s) printing page 2P on the left hand side of the next sheet and printing page I4−2P+1 on the right hand side of the next sheet;
    (t) removing the printed next sheet from the printer such that another sheet in the printer becomes the next sheet available for being printed;
    (u) incrementing P by 1;
    (v) if P<I4/4 then ending said printing the N pages, otherwise looping back to step (q) and performing steps (q)-(v) iteratively until said printing the N pages ends in step (v), wherein steps (q)-(v) are performed in the order recited.

9. The computer program product of claim 8, wherein N<9.

10. A computer program product, comprising a computer usable medium having a computer readable program code embodied therein, said computer readable program code comprising an algorithm adapted to implement a method for printing N graphic pages as a booklet document, said N pages being numbered as page 1, page 2, . . . , page N, said N being a positive integer of at least 2, said method comprising the steps of:

computing a remainder R such that R=N modulo(4); and printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=2 or R=3, and wherein said printing the N pages comprises the steps of:

(a) providing the sheets in a printer such that a next sheet available for being printed is in the printer;

(b) if said computing has computed R=2 then setting I=N+2, I4=N+2, and J=1, and if said computing has computed R=3 then setting I =N+1, I4=N+1, and J=1;

(c) after steps (a)-(b), printing page J on the right hand side of the next sheet;

(d) turning the next sheet in the printer on a short edge of the next sheet;

(e) decrementing I by 1 and incrementing J by 1;

(f) printing page J on the left hand side of the next sheet, and if said computing has computed R=3 then printing page I on the right hand side of the next sheet;

(g) removing the printed next sheet from the printer such that another sheet in the printer becomes the next sheet available for being printed;

(h) if N<5 then removing the printed next sheet from the printer and ending said printing the N pages, otherwise:

(i) decrementing I by 1 and incrementing J by 1;

(j) printing page I on the left hand side of the next sheet and printing page J on the right hand side of the next sheet;

(k) turning the next sheet in the printer on a short edge of the next sheet;

(l) decrementing I by 1 and incrementing J by 1;

(m) printing page J on the left hand side of the next sheet and printing page I on the right hand side of the next sheet;

(n) removing the printed next sheet from the printer such that another sheet in the printer becomes the next sheet available for being printed, wherein steps (c)-(n) are performed in the order recited;

(o) after step (n), if N<9 then removing the printed next sheet from the printer and ending said printing the N pages, otherwise:

(p) setting P=3;

(q) after step (p), printing page I4−2P+2 on the left hand side of the next sheet and printing page 2P−1 on the right hand side of the next sheet;

(r) turning the next sheet in the printer on a short edge of the next sheet;

(s) printing page 2P on the left hand side of the next sheet and printing page I4−2P+1 on the right hand side of the next sheet;

(t) removing the printed next sheet from the printer such that another sheet in the printer becomes the next sheet available for being printed;

(u) incrementing P by 1;

(v) if P<I4/4 then ending said printing the N pages, otherwise looping back to step (q) and performing steps (q)-(v) iteratively until said printing the N pages ends in step (v), wherein steps (q)-(v) are performed in the order recited.

11. The computer program product of claim 10, wherein said computing has computed R=2.

12. The computer program product of claim 11, wherein N<9.

13. The computer program product of claim 10, wherein said computing has computed R=3.

14. The computer program product of claim 13, wherein N<9.

15. A system comprising a computer and computer usable medium having a computer readable program code embodied therein, said program code when executed by the computer implements a method for printing N graphic pages as a booklet document, said N pages being numbered as page 1, page 2, . . . , page N, said N being a positive integer of at least 2, said method comprising the steps of:

computing a remainder R such that R=N modulo(4); and printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=1, and wherein said printing the N pages comprises the steps of:

(a) providing the sheets in a printer such that a next sheet available for being printed is in the printer;

(b) setting I=N+3, I4=N+3, and J=1;

(c) after steps (a)-(b), printing page J on the right hand side of the next sheet;

(d) if N<5 then removing the printed next sheet from the printer and ending said printing the N pages, otherwise:

(e) turning the next sheet in the printer on a short edge of the next sheet;

(f) decrementing I by 1 and incrementing J by 1;

(g) printing page J on the left hand side of the next sheet;

(h) removing the printed next sheet from the printer such that another sheet in the printer becomes the next sheet available for being printed;

(i) decrementing I by 1 and incrementing J by 1;

(j) printing page J on the right hand side of the next sheet;

(k) turning the next sheet in the printer on a short edge of the next sheet;

(l) decrementing I by 1 and incrementing J by 1;

(m) printing page J on the left hand side of the next sheet and printing page I on the right hand side of the next sheet;

(n) removing the printed next sheet from the printer such that another sheet in the printer becomes the next sheet available for being printed, wherein steps (c)-(n) are performed in the order recited;

(o) after step (n), if N<9 then removing the printed next sheet from the printer and ending said printing the N pages, otherwise:

(p) setting P=3;

(q) after step (p), printing page I4−2P+2 on the left hand side of the next sheet and printing page 2P−1 on the right hand side of the next sheet;

(r) turning the next sheet in the printer on a short edge of the next sheet;

(s) printing page 2P on the left hand side of the next sheet and printing page I4−2P+1 on the right hand side of the next sheet;

(t) removing the printed next sheet from the printer such that another sheet in the printer becomes the next sheet available for being printed;

(u) incrementing P by 1;

(v) if P<I4/4 then ending said printing the N pages, otherwise looping back to step (q) and performing steps (q)-(v) iteratively until said printing the N pages ends in step (v), wherein steps (q)-(v) are performed in the order recited.

16. The system of claim 15, wherein N<9.

17. A system comprising a computer and computer usable medium having a computer readable program code embodied therein, said program code when executed by the computer implements a method for printing N graphic pages as a booklet document, said N pages being numbered as page 1, page 2, . . . , page N, said N being a positive integer of at least 2, said method comprising the steps of:

computing a remainder R such that R=N modulo(4); and printing the N pages on a plurality of sheets of the document according to a printing sequence of the N pages dictated by the remainder R, wherein each sheet has a recto side and a verso side, and wherein the recto and verso sides each have a left hand side and a right hand side, wherein said computing the remainder R has computed R=2 or R=3, and wherein said printing the N pages comprises the steps of:

(a) providing the sheets in a printer such that a next sheet available for being printed is in the printer;

(b) if said computing has computed R=2 then setting I=N+2, I4 =N+2, and J=1, and if said computing has computed R=3 then setting I=N+1, I4=N+1, and J=1;

(c) after steps (a)-(b), printing page J on the right hand side of the next sheet;

(d) turning the next sheet in the printer on a short edge of the next sheet;

(e) decrementing I by 1 and incrementing J by 1;

(f) printing page J on the left hand side of the next sheet, and if said computing has computed R=3 then printing page I on the right hand side of the next sheet;

(g) removing the printed next sheet from the printer such that another sheet in the printer becomes the next sheet available for being printed;

(h) if N<5 then removing the printed next sheet from the printer and ending said printing the N pages, otherwise:

(i) decrementing I by 1 and incrementing J by 1;

(j) printing page I on the left hand side of the next sheet and printing page J on the right hand side of the next sheet;

(k) turning the next sheet in the printer on a short edge of the next sheet;

(l) decrementing I by 1 and incrementing J by 1;

(m) printing page J on the left hand side of the next sheet and printing page I on the right hand side of the next sheet;

(n) removing the printed next sheet from the printer such that another sheet in the printer becomes the next sheet available for being printed, wherein steps (c)-(n) are performed in the order recited;

(o) after step (n), if N<9 then removing the printed next sheet from the printer and ending said printing the N pages, otherwise:

(p) setting P=3;

(q) after step (p), printing page I4−2P+2 on the left hand side of the next sheet and printing page 2P−1 on the right hand side of the next sheet;

(r) turning the next sheet in the printer on a short edge of the next sheet;

(s) printing page 2P on the left hand side of the next sheet and printing page I4−2P+1 on the right hand side of the next sheet;

(t) removing the printed next sheet from the printer such that another sheet in the printer becomes the next sheet available for being printed;

(u) incrementing P by 1;

(v) if P<I4/4 then ending said printing the N pages, otherwise looping back to step (q) and performing steps (q)-(v) iteratively until said printing the N pages ends in step (v), wherein steps (q)-(v) are performed in the order recited.

18. The system of claim 17, wherein said computing has computed R=2.

19. The system of claim 18, wherein N<9.

20. The system of claim 17, wherein said computing has computed R=3.

21. The system of claim 20, wherein N<9.

* * * * *